United States Patent
Ishikawa et al.

(10) Patent No.: US 7,031,527 B2
(45) Date of Patent: Apr. 18, 2006

(54) AUTOMATIC DIGITIZATION OF GARMENT PATTERNS

(75) Inventors: Hiroshi Ishikawa, Nagoya (JP); John Amico, Bronxville, NY (US); Carmelo Sberna, Bronxville, NY (US)

(73) Assignee: Nhega, LLC, New York, NY (US)

( * ) Notice: Subject to any disclaimer, the term of this patent is extended or adjusted under 35 U.S.C. 154(b) by 55 days.

(21) Appl. No.: 10/492,722

(22) PCT Filed: Sep. 30, 2002

(86) PCT No.: PCT/US02/31177

§ 371 (c)(1),
(2), (4) Date: Apr. 15, 2004

(87) PCT Pub. No.: WO03/034324

PCT Pub. Date: Apr. 24, 2003

(65) Prior Publication Data

US 2004/0247180 A1 Dec. 9, 2004

Related U.S. Application Data

(60) Provisional application No. 60/329,574, filed on Oct. 17, 2001.

(51) Int. Cl.
*G06K 9/46* (2006.01)

(52) U.S. Cl. .................. 382/203; 382/316; 356/238.1; 345/582

(58) Field of Classification Search ................ 382/108, 382/111, 112, 113, 141, 151, 169–174, 181, 382/194, 197–203, 209, 243, 256–270, 285, 382/289, 175, 312, 316, 321, 168; 356/238.1, 356/429; 348/207.1; 345/582, 622; 700/130, 700/135, 138, 143, 217; 250/235; 33/17 R, 33/17 A
See application file for complete search history.

(56) References Cited

U.S. PATENT DOCUMENTS

| | | | | |
|---|---|---|---|---|
| 4,575,628 A | * | 3/1986 | Bankart et al. | 250/235 |
| 4,583,181 A | * | 4/1986 | Gerber et al. | 700/143 |
| 4,780,960 A | * | 11/1988 | Merz | 33/17 R |
| 5,379,350 A | * | 1/1995 | Shimazu et al. | 382/197 |
| 5,815,398 A | * | 9/1998 | Dighe et al. | 700/217 |
| 5,831,857 A | * | 11/1998 | Clarino et al. | 700/135 |
| 6,587,745 B1 | * | 7/2003 | Polden et al. | 700/138 |

* cited by examiner

*Primary Examiner*—Bhavesh M. Mehta
*Assistant Examiner*—Seyed Azarian
(74) *Attorney, Agent, or Firm*—Brown, Raysman, Millstein, Felder & Steiner LLP

(57) ABSTRACT

The present invention relates to a system and method for digitizing shapes especially for garment styles by using image scanning techniques.

18 Claims, 14 Drawing Sheets

AUTOMATIC DIGITIZATION OF GARMENT PATTERNS

TECHNICAL FIELD

The present invention relates to digitization of garment styles, and, more specifically, automatic or semi-automatic digitization of garment styles through image scanning technique.

BACKGROUND ART

A garment is generally made by sewing together a number of pieces of clothes. A design of a garment, then, is largely determined by the shapes of these pieces. Traditionally, pieces of thick papers with exactly the same shape and size as the pieces of clothes are used to record the shapes that determine the design of a garment. These variously shaped thick papers are called "patterns" in the industry. A collection of patterns that comprise a whole garment is called a style. Given such a style, one can make the pieces of clothes by simply copying the shape of the patterns, and then produce a garment of desired design by sewing the clothes together.

In an industrial setting, where many different designs and sizes of garments are produced, it is a major effort to correctly inventory and manage hundreds or more of styles. Thus, a computerization of the process of recording and managing garment design was introduced to the industry. In a computerized design management system, the shape of each cloth is stored as a set of curves and lines, making a digital pattern. From such a digital pattern, it is easy to plot a life-sized shape on a piece of paper using a plotter, or even automatically cut such a shape out of paper or a cloth using a special plotter that has cutters instead of pens.

There are many benefits to such computerization of the design. When the shape and size of each piece of cloth are recorded in a digital form, it is much easier to record and manage a large set of such designs. Also, digitized design can be transmitted to far off location, where garments are manufactured. The biggest advantage, however, might be the ease of grading. Usually, in an industrial setting, garments of several different sizes of the same basic design have to be manufactured. Modification of styles to produce different sizes of garments is called grading. This process of grading is much easier and faster when done on a computer.

The input and output of the system is in a physical form. The output is, of course, the actual garment that is manufactured. In theory, it is conceivable to put the whole process on a computer except for manufacturing; fashion designers, or stylists, could design dresses and suits on a computer screen, and have the results sent out to the factory, where the design is put into a physical form for the first time. However, at least for most of the current generation of stylists, it is much more natural and easier to use a physical form, that is, the physical patterns made of thick papers. Thus, at the beginning of the process, a stylist produces a style, i.e., a collection of physical patterns, and then each pattern is digitized into a digital form by a "modeler," who uses a "digitizer" to trace the contour of the pattern.

This process of digitizing the physical patterns has been slow and labor-intensive. Typically, the modeler fixes the pattern on a large digitizer board and the trace the contour of the pattern by pointing (with a special pointer) relevant points on the contour one by one and pushing a button that signals the digitizer board to locate and record the position of the pointer on the board.

U.S. Pat. No. 4,575,628 (1986) to Bankart, et al. teaches a pattern scanner. However, it has not been widely used partly because of its inability to automatically identify corners on the outline of patterns. The outline of the pattern is its single most important feature and the discrimination of the points on the outline into those that are corners and that are not is very important. To wit, corners are the most salient feature of the shape of the outline and also are often used as grade points. Almost all computerized design management system currently in use treat corner points differently from other points. Thus in the prior art the user have to either digitize manually with digitizer board or use an existing pattern scanner and then mark corners manually.

The present invention relates to this process of digitizing the physical patterns.

DISCLOSURE OF INVENTION

Accordingly, it is an object of the invention to provide a method to automatically digitize garment patterns. It is further object of the invention to provide a method to automatically digitize garment patterns so that the resulting data includes information on the shape of the pattern, including the identification of corners.

FIG. 1 shows the process of the invention. First, a physical pattern (101), that is, the paper shaped as a piece of cloth that is part of a garment, is scanned into a raster image (102). This can be done with any of current digital imaging techniques. For instance, a flatbed scanner (103) commonly seen in offices or a CCD digital camera (104) can be used. In an industrial setting, a large-format scanner (105) would be used. The result is a raster image (102), or a digital facsimile of the physical pattern. The second stage recognizes features such as intensity edges in the raster image and produces a digital pattern (106), or a set of relevant information in the physical pattern, in a digital form. The relevant information includes the shape and the size of the physical pattern, and lines and curves drawn on the physical pattern. The information shall be represented digitally in a useful form, that is, in a representation that is easy for the machine to handle. For instance, to control a plotter to draw the outline of the pattern, it is necessary that the coordinates of successive points on the outline be explicitly known. Thus, the digital pattern should include an explicit representation of the outline. Such explicit representation may be a series of point coordinates, or some description of curves such as spline parameters, but clearly cannot be a raster image. It is a non-trivial task to extract this information from a raster image, which is in quite a different representation.

Stage 1: Scan

The first stage (107) scans the physical pattern into a raster image. This can be done with any of current digital imaging techniques. For instance, a flatbed scanner (103) commonly seen in offices, or a CCD digital camera (104) can be used. In an industrial setting, a large-format scanner (105) might be used. The result is a raster image (102), i.e., a digital facsimile of the physical pattern.

Stage 2: Recognition

Given a raster image (102) of the pattern from the first stage, the method extracts relevant information from it. The single most important information about the pattern is its outline (108). Other important features include lines and curves drawn on the pattern (109), which we call internal curves hereafter. Both the outline and the internal curves appear in the raster image as curves. Therefore, the method recognizes curves in the raster image. There is more than one conceivable algorithm to detect and recognize curves. Any algorithm that robustly recognizes curves in the raster image can be used for the present invention.

Such an algorithm finds characteristic pixels in the raster image that are positioned like a curve. What characterizes such a pixel depends on what kind of curves the algorithm is looking for. In the case the color of the background and the pattern paper are known, a pixel on the outline of the pattern is characterized as a boundary of the two colors. A pixel on an internal curve is characterized by its color different from the pattern paper color. Though such simple characterizations by themselves are not enough, they serve as local criteria to narrow down the locus of the curves. Having found a set of candidate pixels that satisfy the local criteria, the algorithm finds curves that lie on such pixels.

The result of this stage is a set of data, which we call a digital pattern. It comprises the representation of curves that constitute the outline and the internal curves. The representation is such that the coordinates of successive points on the curves can be readily calculated. Additionally, the digital pattern may include other accompanying data such as an identification number, date of production, and what kind of fabric should be used, which can be entered to the system manually. It may even include the original raster image so that, should a mistake in the second stage be discovered later, the recognition can be redone, perhaps with a different set of parameters.

Stage 3: Manual Data Input (Optional)

Each pattern has some accompanying data such as an identification number, date of production, and kind of fabric that should be used. This can be entered by an operator manually. Some of the accompanying data is written on the physical pattern. For instance, grading information sometimes is represented as numbers written on the pattern near points on the scanner. In FIG. 1, one of the patterns shown (111) is an example of this. White arrows indicate the handwritten numbers that represent important information. While it would be best if it could be machine-read, it might be technically difficult to reliably recognize all the information scattered over the pattern. Instead, all these data can be input by an operator. To facilitate this, the system can show the raster image of the pattern on the computer screen so that the operator can read the data off the screen. It can even move the part of the image from showing one number to another when inputting the grading information.

BEST MODE FOR CARRYING OUT THE INVENTION

Here, an embodiment of the present invention is described in detail. The embodiment is a standard PC system equipped with a scanner. The hardware configuration is an ordinary one that is available from computer equipment vendors and can be easily configured by a person skilled in the art.

Scan

Figure 1:
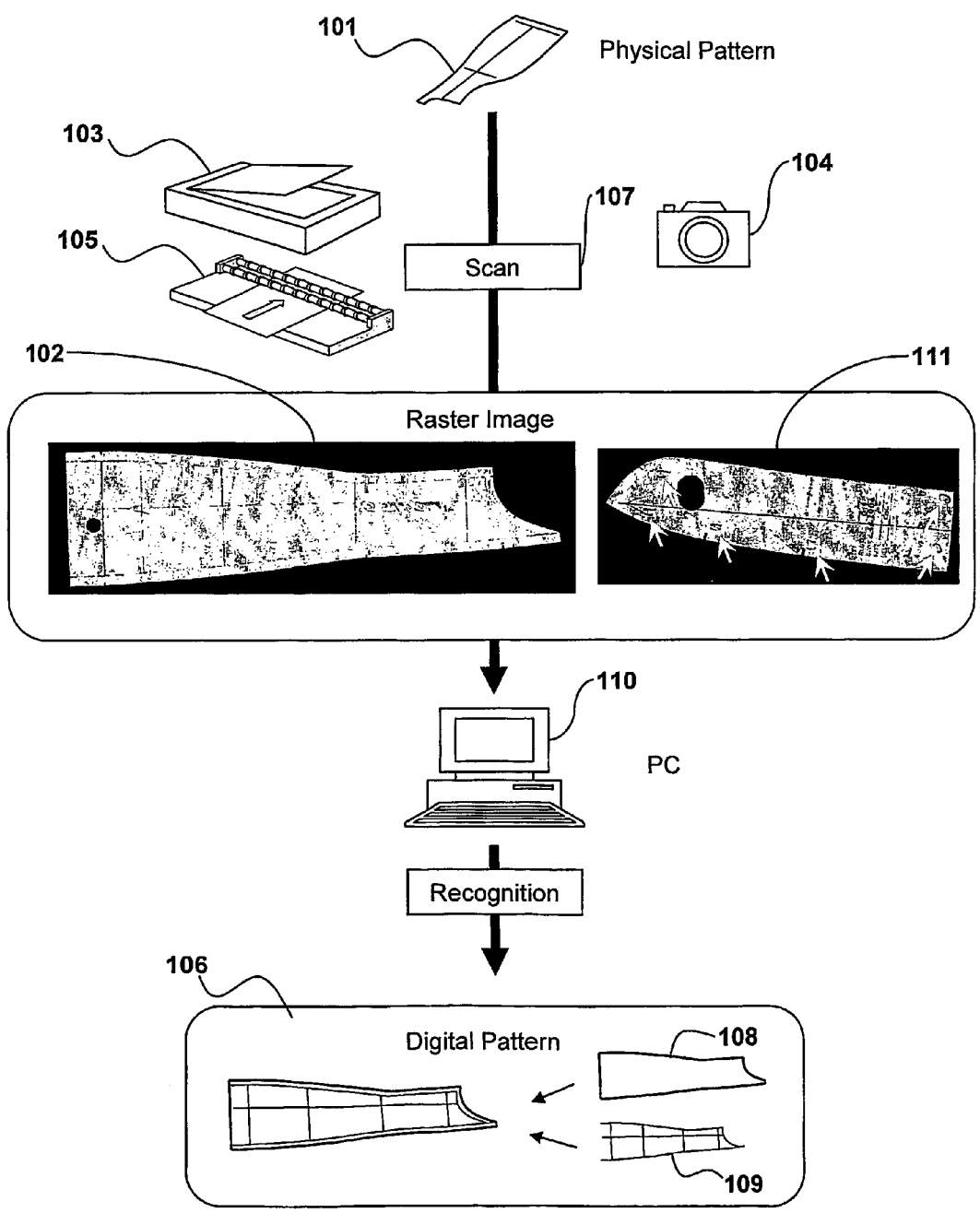
FIG. 1 shows the process of the invention.

A physical pattern is scanned by the scanner and sent to the PC (110) and stored in a bitmap format. The format can be any known or proprietary format. In the following, we assume that the background of the scanned image appears in a specific color (e.g., black) that is not used as the color of a physical pattern (i.e., the thick paper shaped as a piece of cloth that is a part of a garment). Although the specific color (black) is not important, the color black is almost never used as the color of the paper for the physical pattern. It is also easy to arrange so that the background appears in the specific color. FIG. 1 shows a typical scanned bitmap image (102) of a physical pattern.

Large Format Scanner

Figure 2A:
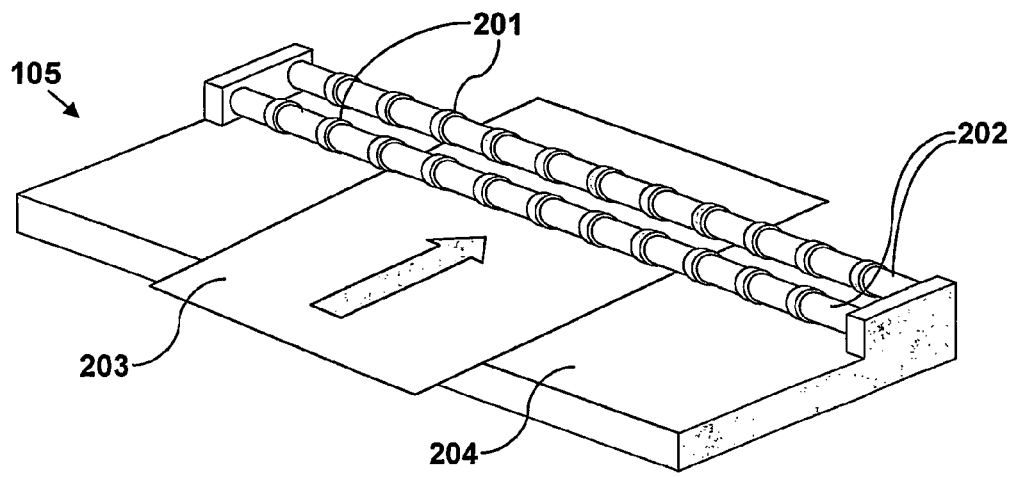
FIG. 2a shows a typical large format scanner.
Figure 2B:
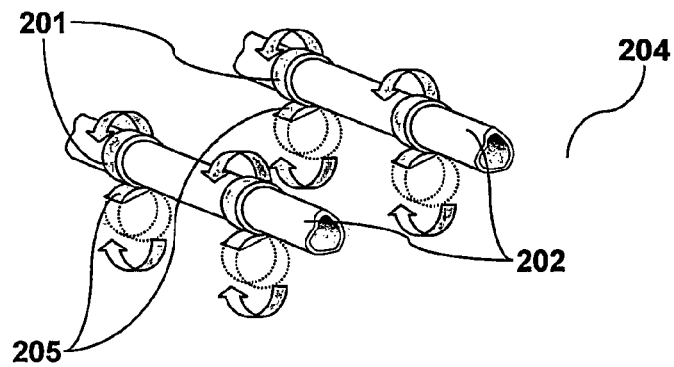
FIG. 2b shows a magnified view of the rotating assembly.

Here we discuss a large format scanner that is modified to suit the need of scanning garment patterns. FIG. 2a shows a typical large format scanner (105). It has a set of rollers (201) that rotate to move a paper (203) (or whatever the user wishes to scan) on the holding surface (204). The paper (203) is placed with the side one wish to scan facing below. From below the holding surface (204), an optical scan occurs. Rollers are typically made of foam rubber and attached to two bars (202) that also rotate. FIG. 2b shows a magnified view of the rotating assembly. Below the holding surface (204) are another set of rollers (205) that rotates cooperatively with the rollers (201) above the surface (204) to facilitate a smooth motion of the paper (203).

Figure 2C:
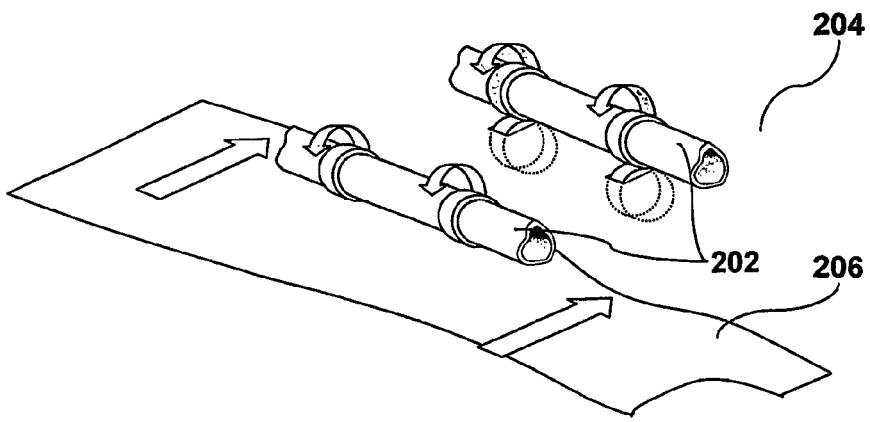
FIG. 2c shows a situation where a garment pattern is fed to the scanner.
Figure 2D:
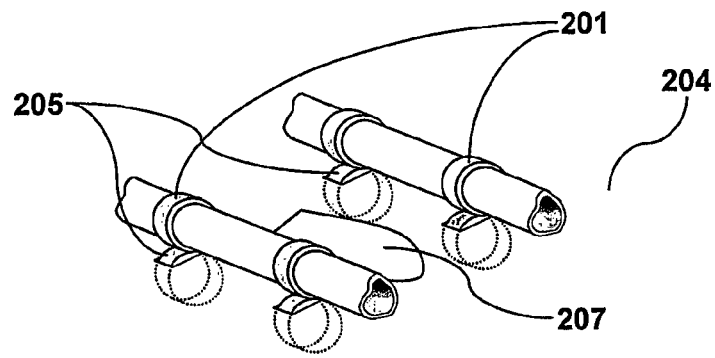
FIG. 2d shows a small garment pattern that is stuck between the reach of the rollers.
Figure 2E:
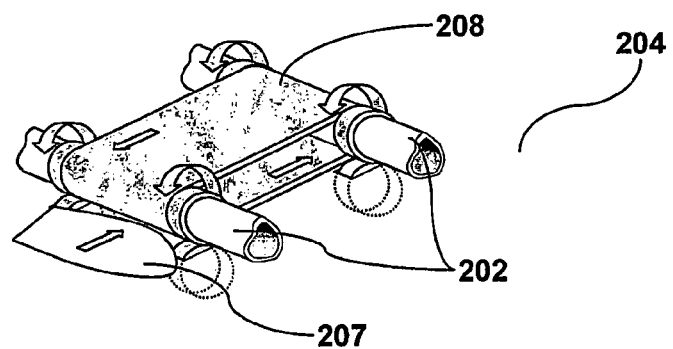
FIG. 2e shows a belt spanned across the two bars.
Figure 2F:
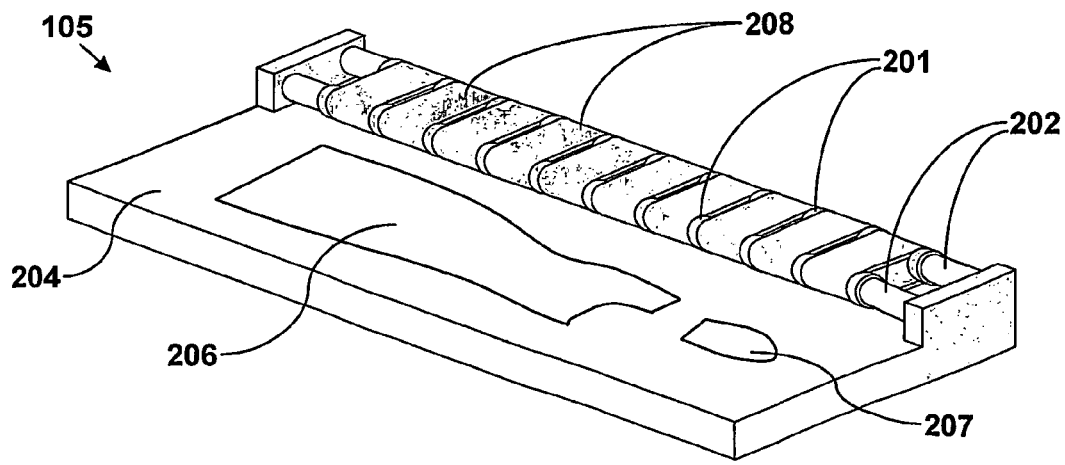
FIG. 2f shows the whole scanner with the belt.

FIG. 2c shows a situation where a garment pattern (206) is fed to the scanner. A problem occurs when one tries to scan a garment pattern instead of regular square paper. Some garment patterns are too small to be scanned with such a large scanner. FIG. 2d shows a small garment pattern (207) that is stuck between the reach of the rollers (201, 205). Although for such small garment patterns one can use smaller scanners such as flatbed scanner (103) commonly seen in offices, it is more convenient to be able to use the same large format scanner for all patterns. To make it possible, a moving surface must in contact with the pattern at all times. FIG. 2e shows how to make that possible by spanning a belt (208) across the two bars (202). The belt is also made of foam rubber. The whole scanner with this modification is shown in FIG. 2f.

Figure 2G:
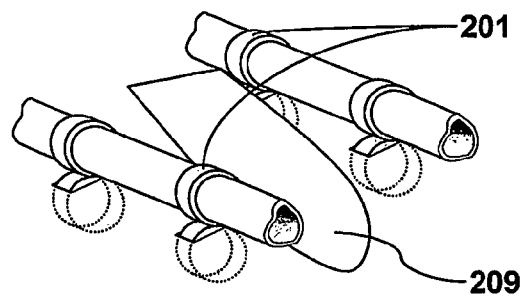
FIG. 2g shows a pattern rotated when it is in contact with only a few rollers.
Figure 2H:
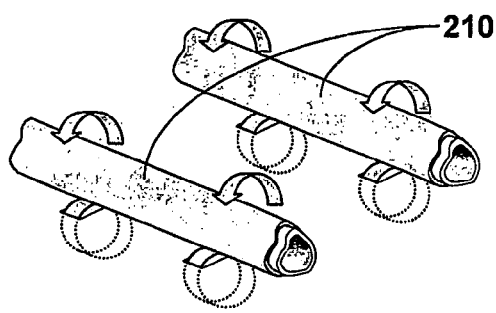
FIG. 2h shows the rollers made much wider.
Figure 2I:
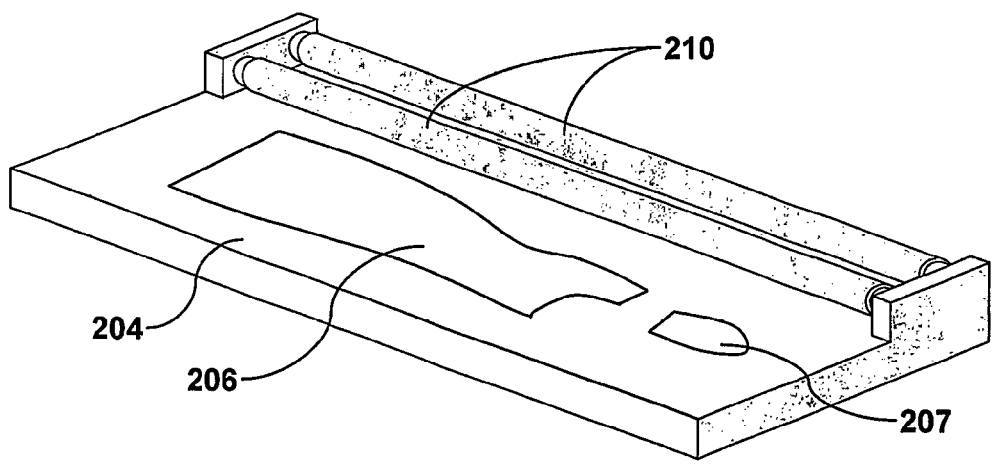
FIG. 2i shows the whole bar made a long roller.

Another problem with typical large format scanner when scanning irregularly shaped objects like garment patterns is that the object (209) tends to be unstable. For instance, it tends to rotate, as shown in FIG. 2g, when it is in contact with only a few rollers (201). Making the rollers much wider as the rollers (210) shown in FIG. 2h and indeed making the whole bar a long roller as shown in FIG. 2i solves this problem.

Figure 2J:
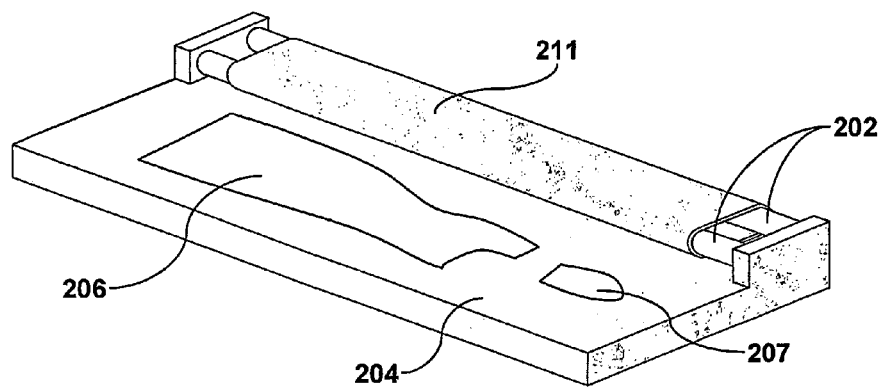
FIG. 2j shows a modification of the scanner that spans a wide belt between the two bars.

Combining the two modifications, FIG. 2j shows a modification that spans a wide belt (211) between the two bars (202) to solve both problems above.

Figure 2K:
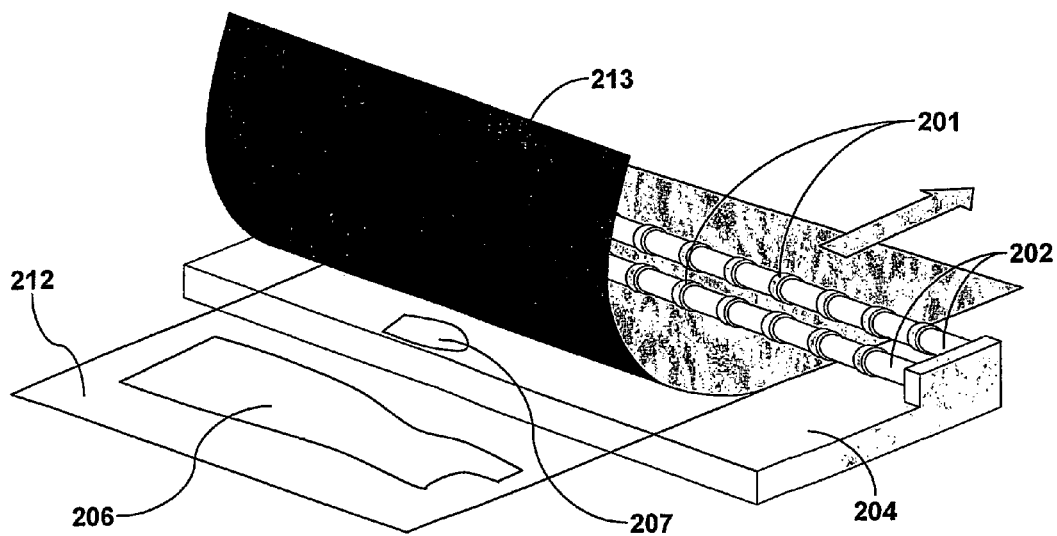
FIG. 2k shows a use of a large transparent sheet and a background sheet to act as one entity that is moved through the scanner.

A different approach (FIG. 2k) to provide a moving surface is to use a large transparent sheet (212) and a background sheet (213) to act as one entity that is moved through the scanner. Large and small garment patterns alike (206, 207) can be placed between the two sheets. The scanner can optically scan the patterns from below because the sheet below (212) is transparent. The background sheet (213) is black to appear as a background color in the resulting raster image.

Recognition

The recognition stage, which extracts relevant information from the bitmap image, is realized as a computer program that runs on the PC system. The program loads the scanned bitmap image and produces a computer file that stores the extracted data. In this embodiment, the outline of the pattern, which is the most important feature of the physical pattern, is extracted.

The outline of a pattern is its most important feature, since the cloth would be cut according to the outline. Accordingly, it is most important for the system to precisely identify the outline of the pattern. To achieve the most precise and robust performance, the embodiment employs a special method just for detecting the outline that uses special properties of outlines. The method exploits the fact that an outline is always a single closed curve. It also uses the information about the colors of the background and the pattern. More specifically, the method finds a closed curve, which is a boundary of the two colors and such that the part of the image outside it is filled with the background color. Some parameters depend on the resolution of the image. For concreteness, a resolution of 75 DPI (Dots Per Inch) is assumed.

Data Structures

Figure 3:
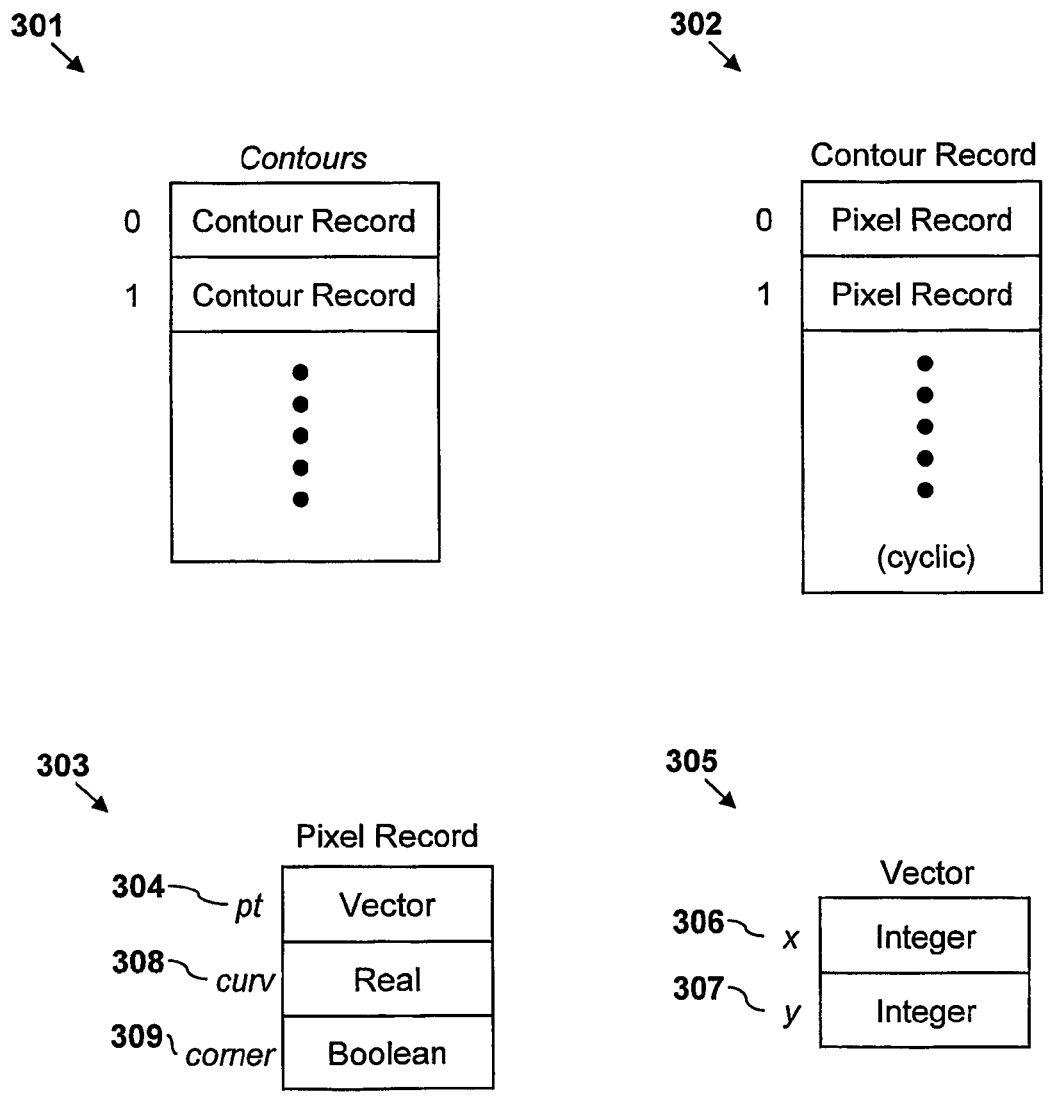
FIG. 3 schematically shows the data structure Contours.

The method keeps a data structure Contours, which, as schematically shown in FIG. 3 (301), holds one or more contour record. Each contour record is a data structure, as illustrated in FIG. 3 (302), that comprises a data structure that can hold a variable number of pixel records, such as variable-length array or a list. Each pixel record comprises several fields (303). The pt field (304) is a variable of type Vector (305), which itself has two fields, x (306) and y (307), which are integer variables that represent the coordinates of a pixel in an image. Other fields include curv (308), which is a real number variable, and corner (309), a Boolean variable. Individual pixel record in a contour record is accessed by an index. In the following, as well as in the figures, the number of records in a contour recordf C is denoted by size(C) and its n'th record is denoted by C[n]. Fields are denoted as C[n].pt, C[n].curv, and C[n].corner. The index shall be zero-based throughout. For example, the first record in a contour record ctr has the index 0 and is denoted by ctr[0], whereas the last record has the index size(ctr)−1 and is denoted by ctr[size(ctr)−1]. Since a contour record is used to represent a closed contour, the data structure shall be cyclic, that is, after the last record, there comes the first record again, as far as indices are concerned. Thus, ctr[size(ctr)] indicates the same record as ctr[0] and, more generally, ctr[n+size(ctr)] refers the same record as ctr[n] for any integer n. In particular, negative indices are allowed for simplicity of notation. Thus, for example, ctr[−1] denotes the last record in ctr and the same as ctr[size(ctr)−1].

Detect Outline

Figure 4:
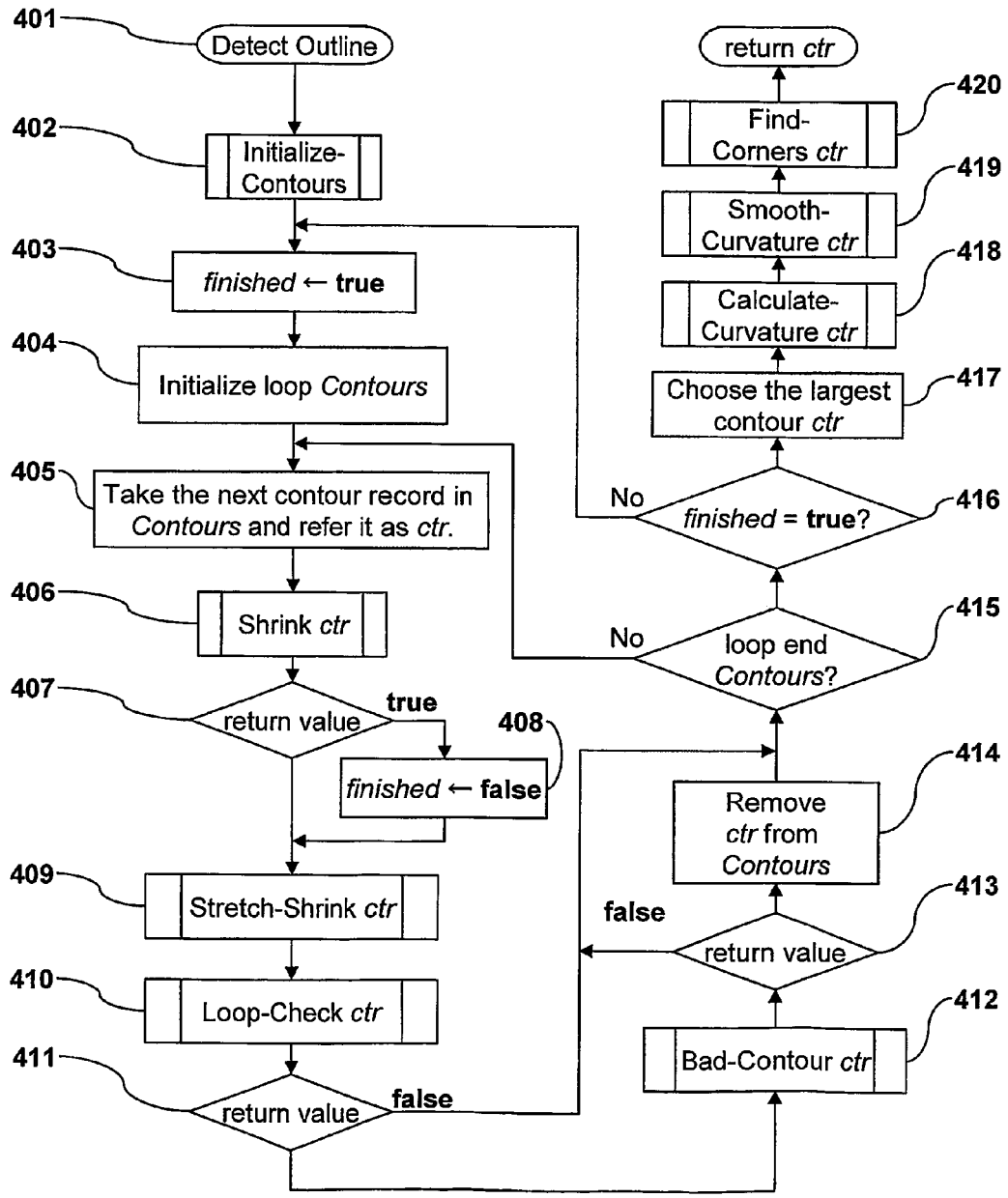
FIG. 4 shows a flow chart of the method to detect outline from a bitmap image.

FIG. 4 shows a flow chart of the method to detect outline from a bitmap image. The entry point is 401. In step 402, the data structure Contours is initialized in a subroutine Initialize-Contours, as will be explained below. Then there are two nested loops. The outer loop iterates until a Boolean variable finished, which is set to true at the beginning (403) of the iteration, remains true till its end (416). That is, if the variable finished is found to be false at 416, the outer loop does not exit and goes back to 403. The inner loop (controlled by initialize-step 404, increment-step 405, and exit-test-step 415) iterates through all contour records in Contours. The current contour record is referred as ctr inside the inner loop. In the inner iteration, the current contour record ctr is passed to several subroutines by reference. Each subroutine will be explained in more details below. First, subroutine Shrink is called (406). The return value will be Boolean, with a value either true or false. It is checked (407) and if it is true, the variable finished is assigned the value false (408). Next, subroutine Stretch-Shrink is called (409). Then subroutine Loop-Check (410) is called and if its return value is true (411), subroutine Bad-Contour (412) is called. If it also returns true (413), the current contour record ctr is removed from Contours (414). At 415 it is checked if the inner loop has iterated for all contour records in Contours. After exiting the outer loop, the largest of remaining contours in Contours is selected (417) as the outline contour and referred as ctr. Then ctr is passed to three subroutines that calculates (418) and smooth (419) local curvature and identify corner points (420). The method returns ctr.

The output of the method is the contour stored in ctr, the return value. It is a succession of pixel records, each of which holding a pixel coordinate (pt), curvature at the point (curv) and the information if the point is a corner (corner).

Initialize-Contours

Figure 5:
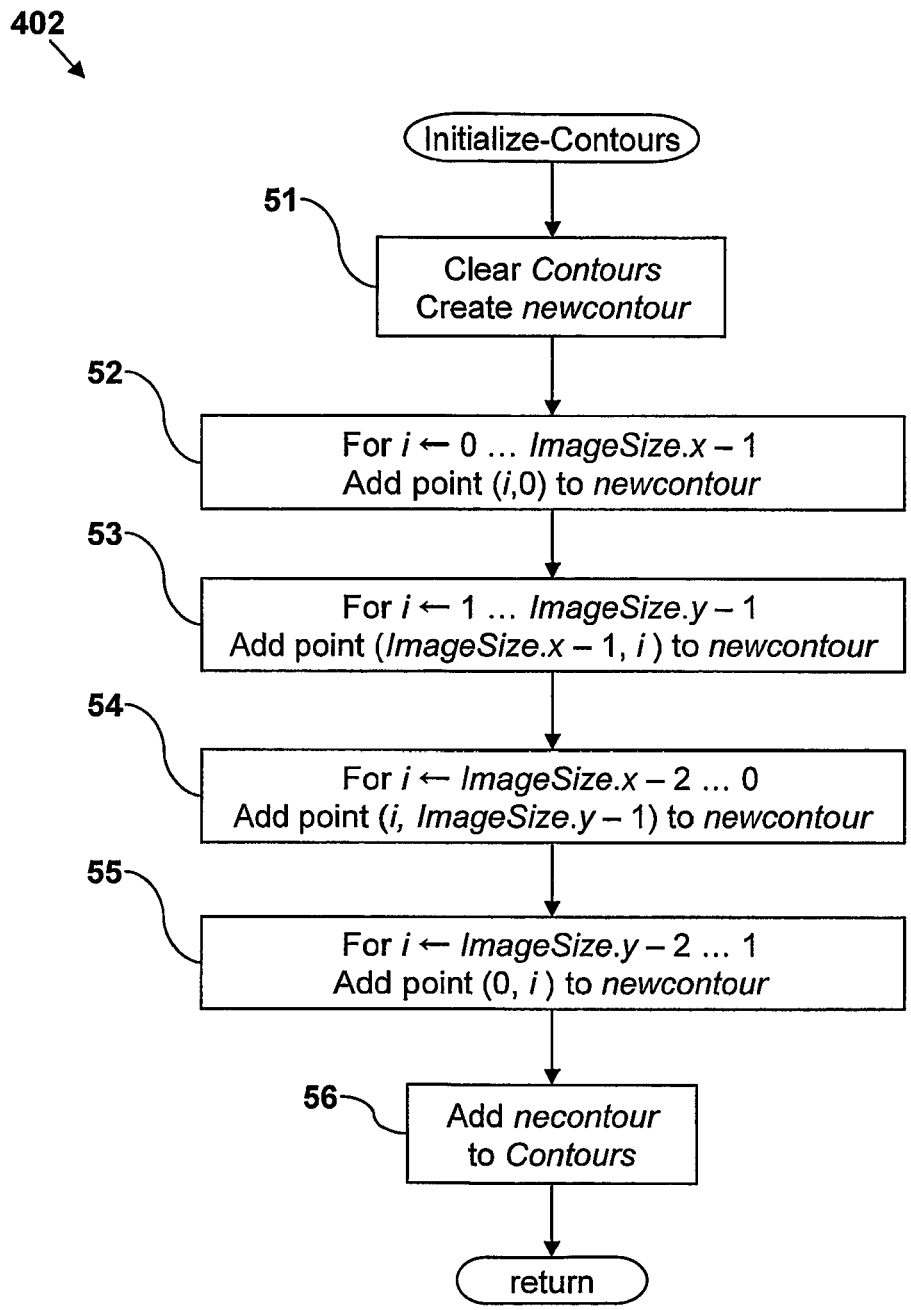
FIG. 5 shows a flow chart of the subroutine Initialize-Contours.

FIG. 5 shows a flow chart of the subroutine Initialize-Contours. First, the data structure Contours is emptied and one new contour record, referred here as newcontour, is created (51). This new contour is then filled with pixel records so that it represents the outline of the image rectangle. We assume a global Vector variable ImageSize contains the size of the image rectangle in variables ImageSize.x and ImageSize.y, which are the width and height of the image in number of pixels. Thus, the new contour begins at the coordinate (0,0) and goes horizontally to (ImageSize.x−1,0) (added in 52), then goes to (ImageSize.x−1, ImageSize.y−1), (53) then (0, ImageSize.y−1) (54), and finally goes back to (0,0) (55). In the figure, "add a point (0,0)" means "add a pixel record with pt field (0,0)", and so on. The new contour is added to the structure Contours (56).

Shrink

Figure 6:
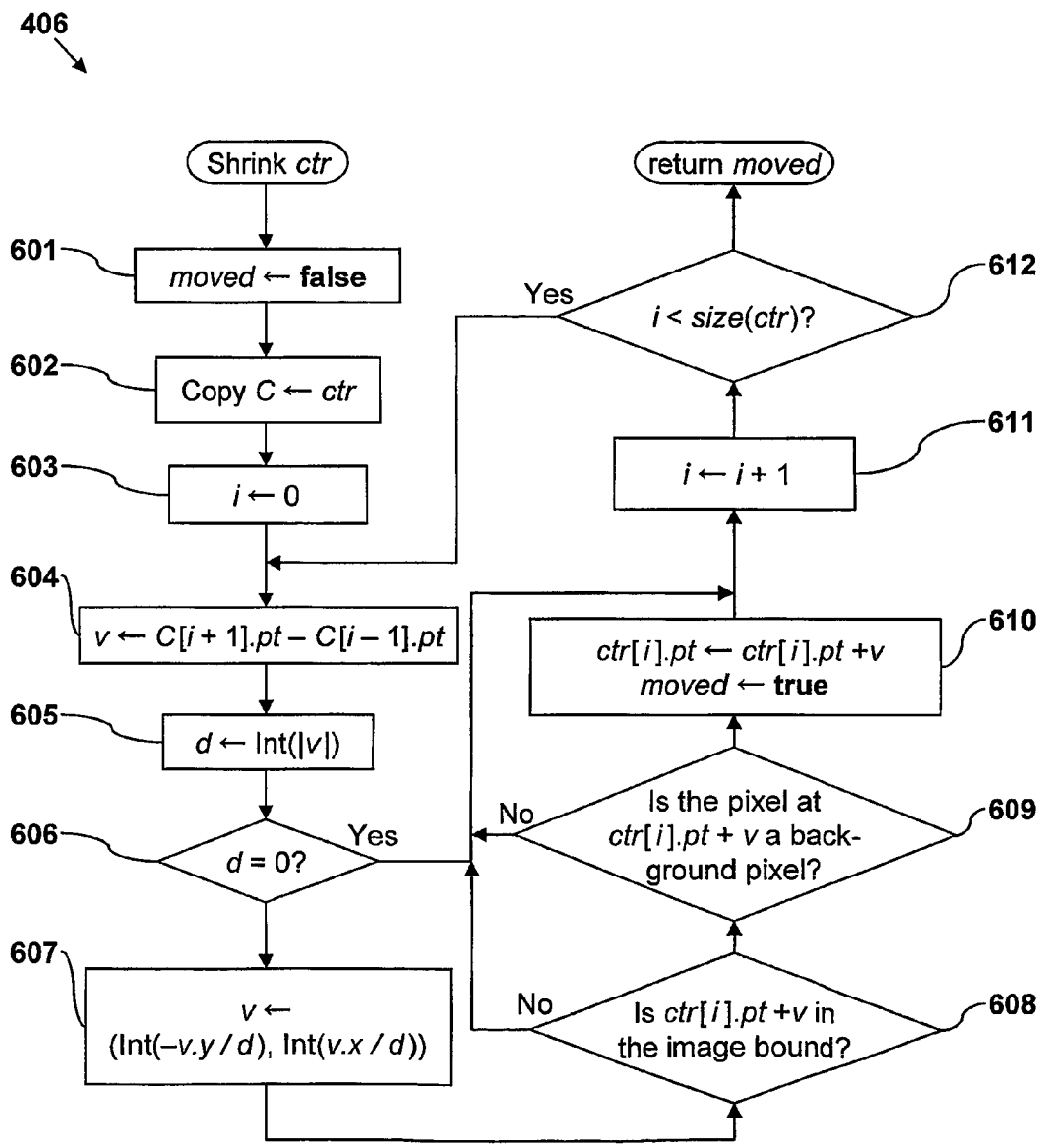
FIG. 6 shows a flow chart of the subroutine Shrink.

FIG. 6 shows a flow chart of the subroutine Shrink. It is called with a reference ctr to a contour record. That is, any change (adding pixel records, deleting pixel records, etc.) that is made to ctr in this subroutine is directly made to the contour record that is passed as the actual parameter on the caller side. In the programming language C++, this can be done by using "call by reference" method of function calling. Other languages have similar facilities to realize this and their use is well known in the art.

First, a Boolean variable moved is initialized to false (601) and ctr is copied to another new contour record data structure C (602). Then, a loop runs through each pixel record in the contour records, incrementing an index i from 0 to size(ctr)−1 (controlled by initialize-step 603, increment-step 611, and exit-test-step 612). Inside the loop, the vector C[i+1].pt−C[i−1].pt is stored in a Vector variable v (604). Remember this vector has integral components. Next, the length |v| of v (that is, the positive square root of $(v.x)^2 + (v.y)^2$) is taken and its integral part is stored in an integer variable d (605). Here, a function Int(t) is assumed to give the integral part of a number t. More specifically, it returns the largest integer not larger than t if t is nonnegative, and the smallest integer not smaller than t if t is negative. If d is zero (606), the loop continues to the next index. Otherwise, the value (Int(−v.y/d), Int(v.x/d)) is assigned to v (607), and then it is checked if the point ctr[i].pt+v is inside the image rectangle (608), and if it is, whether the pixel at that point is a background pixel or not (609). If it is a background pixel, then the point coordinates stored in ctr[i].pt in the contour record ctr is changed to the coordinates ctr[i].pt+v and the variable moved is assigned true (610). After the loop exits, the variable moved is returned as a Boolean return value. This represents whether any point coordinate in the contour record ctr has been moved in the subroutine. This subroutine has an effect of moving each point of the contour to an "inside" direction (v), if it does not hit the non-background pixel.

Stretch-Shrink

Figure 7:
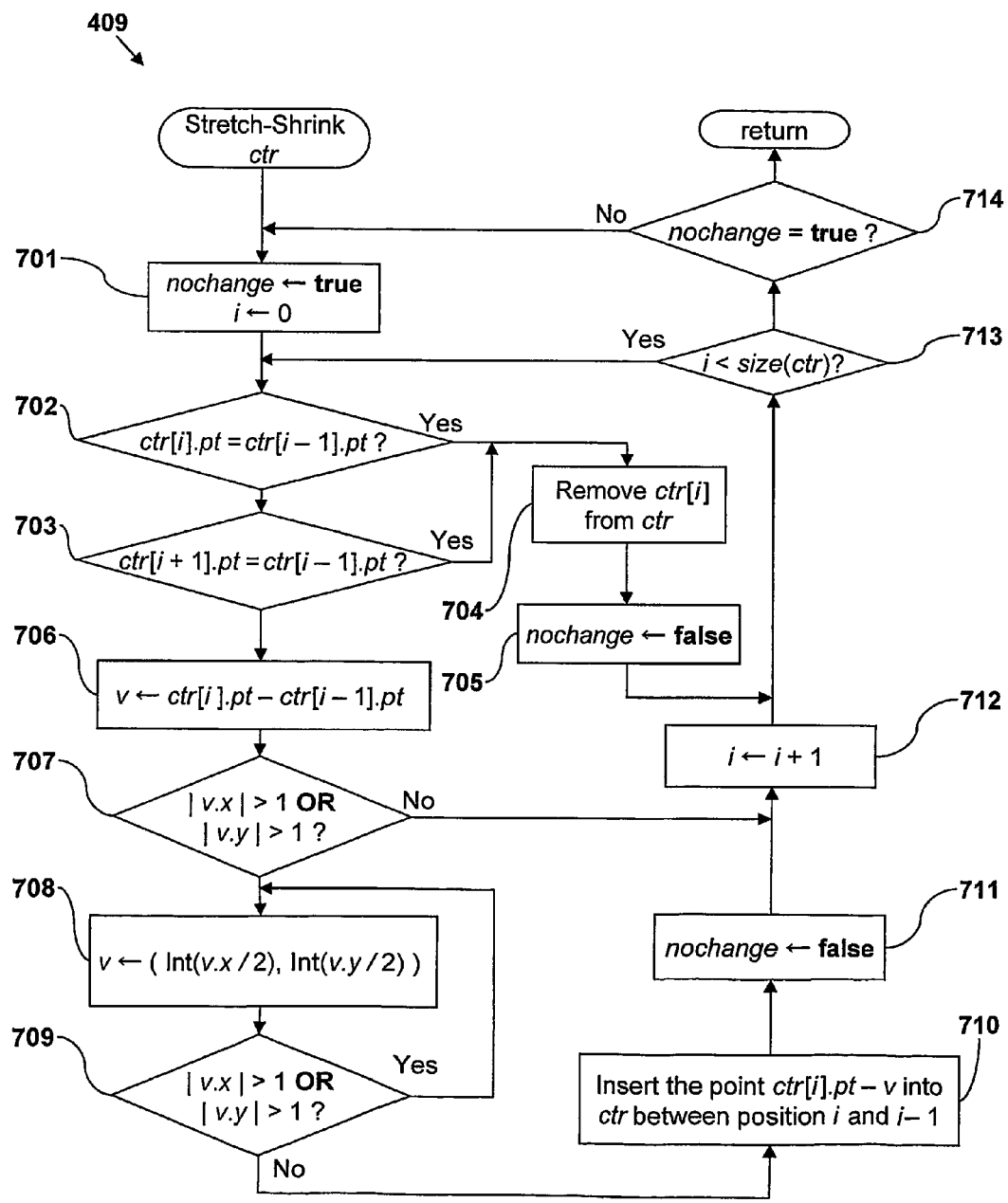
FIG. 7 shows a flow chart of the subroutine Stretch-Shrink.

FIG. 7 shows a flow chart of the subroutine Stretch-Shrink. As the previous subroutine Shrink, it is called with a reference ctr to a contour record. There are two nested loops. The outer loop iterates until a Boolean variable nochange, which is set to true at the beginning (701) of the iteration, remains true till its end (714). The inner loop (controlled by initialize-step 701, increment-step 712, and exit-test-step 713) iterates through all pixel records in ctr using an index i that runs from 0 to size(ctr)−1. In the inner loop, it is first checked if the pair of pixel records in the contour with consecutive indices (702) or the pair with indices that differs by two (703), has the same point coordinate (pt field). If either is the case, the pixel record ctr[i] is removed from the contour record ctr (704) and the Boolean variable nochange is set to false (705). If none of the two is the case, then it is tested if the two consecutive records have point coordinates that are too far apart (more than 1 in either coordinate) as follows. The difference vector ctr [i].pt−ctr [i−1].pt is stored in a variable v (706), and it is tested if |v.x|>1 or |v.y|>1 (707). If neither is the case, the points are not too far apart and the inner loop continues. If either is the case, a new pixel record is inserted between the two records. To find where to insert the new point, v is repeatedly replaced by (Int(v.x/2), Int(v.y/2)) until both |v.x| and |v.y| are at most 1 (708, 709). Then, a pixel record with the point coordinate ctr[i].pt−v is inserted into the contour record ctr at the position between indices i and i−1 (710) and the Boolean variable nochange is set to false (711). This way, the new point would be in between the two points in the image plane, just next to ctr [i].pt. If the new point and ctr [i−1].pt are still too far apart, it will be corrected in the next outer iteration. Thus the subroutine keeps consecutive points in the contour at most one apart in each coordinate.

Loop-Check

Figure 8:
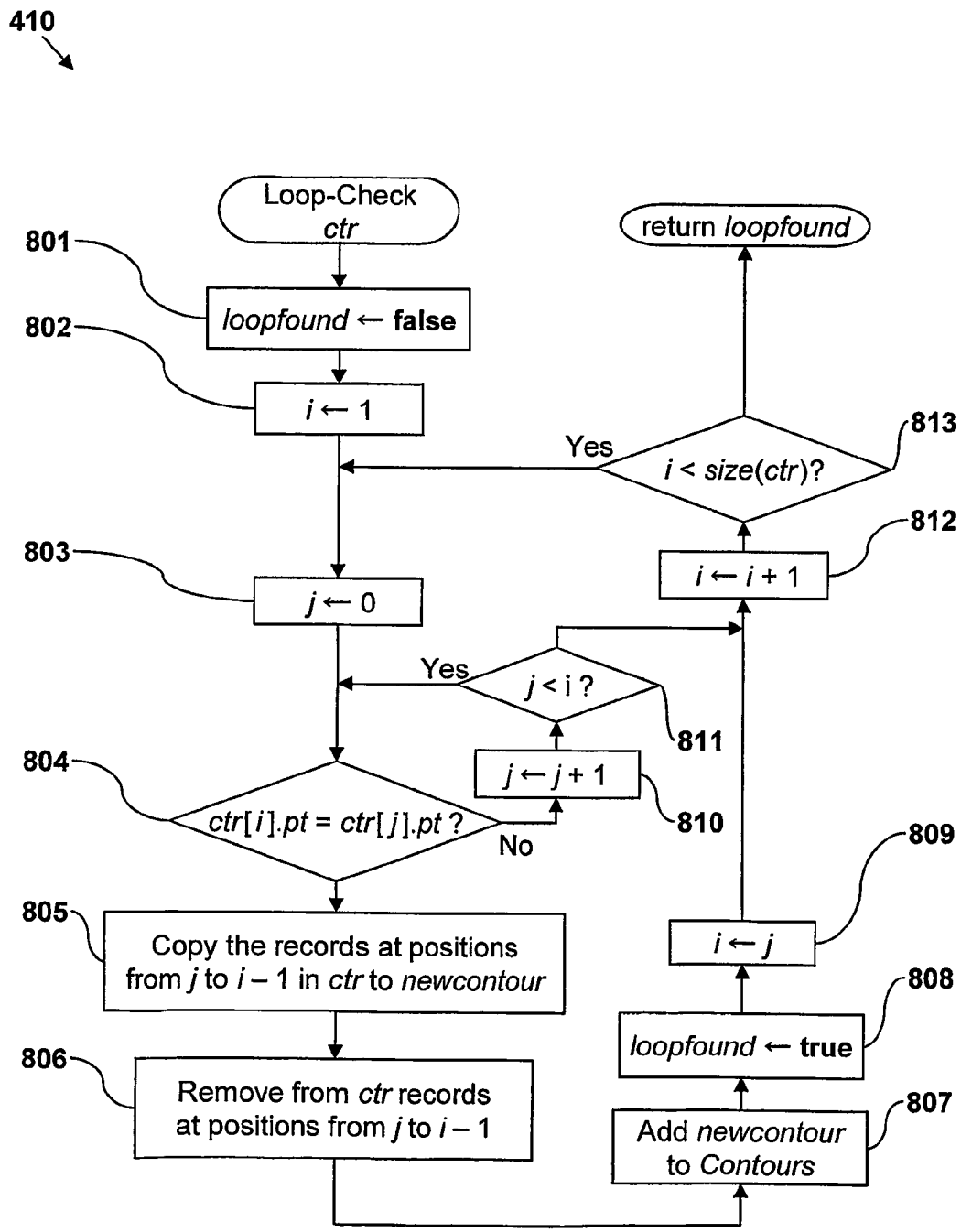
FIG. 8 shows a flow chart of the subroutine Loop-Check.

FIG. 8 shows a flow chart of the subroutine Loop-Check. It is called with a reference ctr to a contour record. The routine checks if there is in the contour any smaller loop than the entire contour by comparing the pt fields of all pairs of pixel records. Thus it has a outer loop (controlled by initialize-step 802, increment-step 812, and exit-test-step 813), i running from 1 to size(ctr)−1, and inner loop (controlled by initialize-step 803, increment-step 810, and exit-test-step 811), j running from 0 to i−1 for the inner loop. It starts with a Boolean variable loopfound false (801). If a loop is found, i.e., ctr[i].pt=ctr[j].pt for some pair i and j (804), the pixel records that represent the looped part of the contour, indexed from j to i−1, are copied to a new contour record newcontour (805) and removed from ctr (806). The newcontour is then added to Contours (807), and the variable loopfound is set to true (808). The index i is modified according to the shortening of ctr (809) and the inner loop is exited. The subroutine returns loopfound, indicating if any loop has been found. This subroutine has the effect of keeping the contours simple contours, i.e., those without self-intersection.

Bad-Contour

Figure 9:
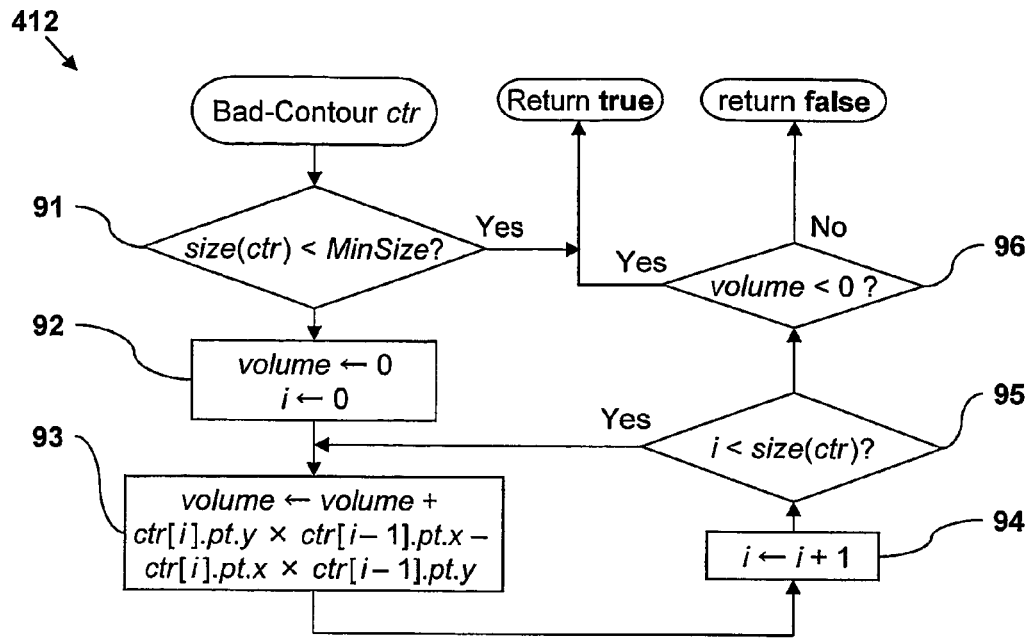
FIG. 9 shows a flow chart of the subroutine Bad-Contour.

FIG. 9 shows a flow chart of the subroutine Bad-Contour. It is called with a reference ctr to a contour record, but it does not modify ctr. It first checks if ctr has a minimum number of points given by a global variable MinSize (91). The optimal value of MinSize depends on a number of parameters, including the resolution of the input image. Since there hardly is any pattern smaller than a few inches, a few times the DPI (Dots Per Inch) value is small enough. If ctr has fewer points than MinSize, the subroutine returns true. If the contour has at least MinSize points, the signed area of the region surrounded by the contour is computed. The signed area changes the sign according to the orientation (clockwise or counterclockwise) and is positive if the contour has the same orientation as the initial contour defined in the subroutine Initialize-Contours; it is negative if the orientation is opposite. The signed area is computed as follows. First, the accumulator variable volume is initialized to zero (92). Then, with a simple loop (controlled by initialize-step 92, increment-step 94, and exit-test-step 95), the value ctr[i].pt.y×ctr[i−1].pt.x−ctr[i].pt.x×ctr[i−1].pt.y is added (93) to volume for each i from 0 to size(ctr)−1. Exiting the loop, the sign of volume is examined (96) and the subroutine returns true if it is negative and false otherwise. A return value of true indicates that the contour is bad, i.e., it is either too small or in the opposite orientation than intended.

Calculate-Curvature

Figure 11:
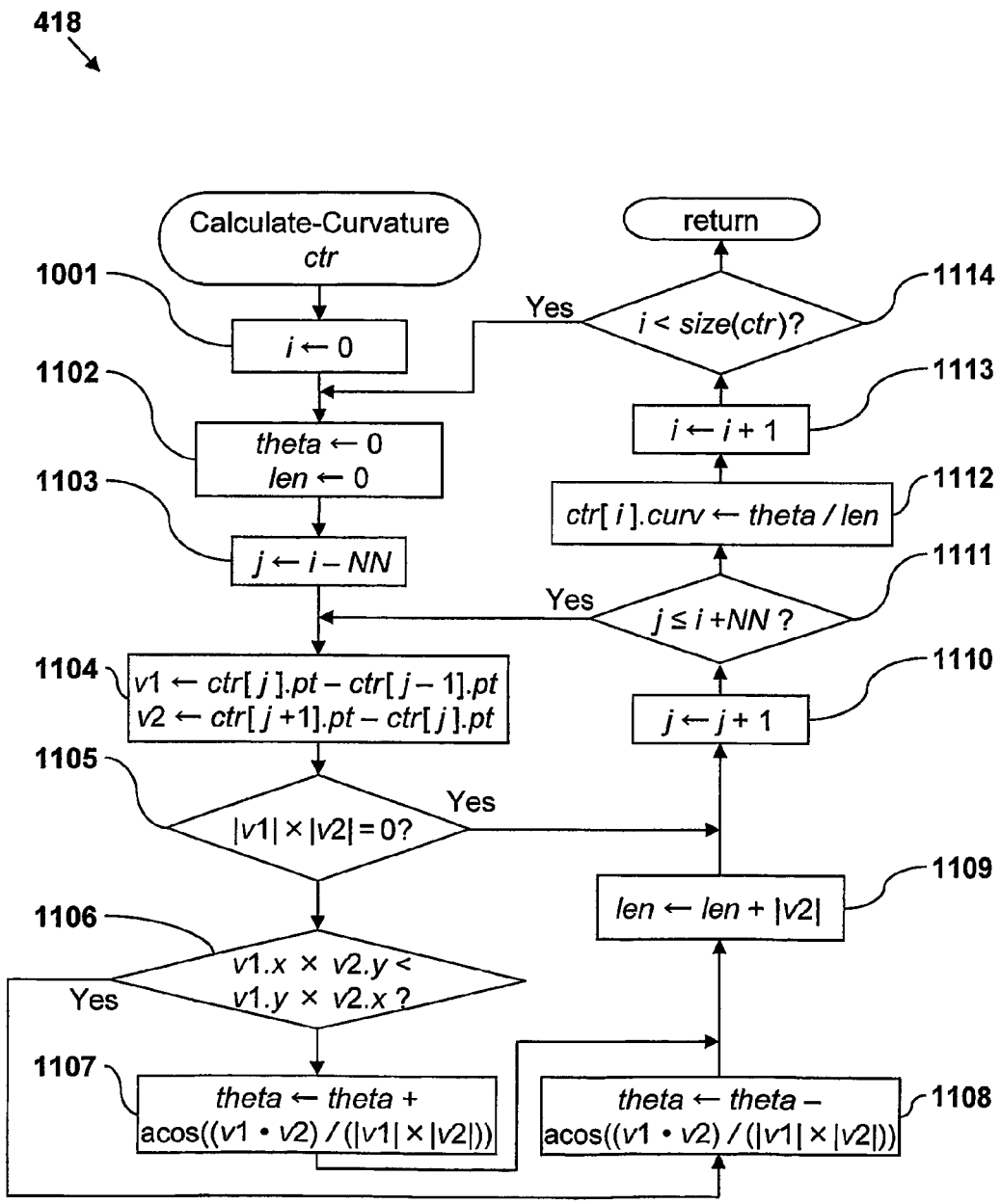
FIG. 11 shows a flow chart of the subroutine Calculate-Curvature.

FIG. 11 shows a flow chart of the subroutine Calculate-Curvature. It is called with a reference ctr to a contour record. The subroutine calculates the average curvature in the neighborhood of each pixel in the contour and stores the value in the curv field in the pixel record. A global integer variable NN determines the radius of the neighborhood. Here, NN=Int(DPI/18) (8 if DPI=150) is given, where DPI is the resolution of the image in dots par inch. The outer loop (controlled by initialize-step 1101, increment-step 1113, and exit-test-step 1114) runs through each pixel record of the contour using an index i. Real-number variables theta and len are initialized to 0 (1102). The inner loop (controlled by initialize-step 1103, increment-step 1110, and exit-test-step 1111) with an index j runs in the neighborhood of the pixel record, i.e., indices from i−NN through i+NN; for each pixel record the vector from the point before (v1) to the current point and the vector from the current point to the point after (v2) is calculated (1104). If neither vector is a zero vector (1105), the angle between the two vectors are calculated using the arccosine of the inner product v1·v2 (defined by v1.x×v2.x+v1.y×v2.y) divided by the product of length of the two vectors. Here, a cos(x) returns for a number x with −1≤x≤1 the angle θ between 0 and π such that cos(θ)=x. The angle needs to be signed, and calculated in two ways (1107, 1108) depending on whether v1.x×v2.y<v1.y×v2.x or not (1106). The angle is added to theta. The length |v2| of vector v2 is added to len (1109). After the inner loop exits, the curvature is calculated by dividing angle by len and stored in ctr[i].curv (1112). Note that in this subroutine small zigzags are smoothed out and the average curvature in the neighborhood is calculated, because the angle is signed.

Smooth-Curvature

Figure 10:
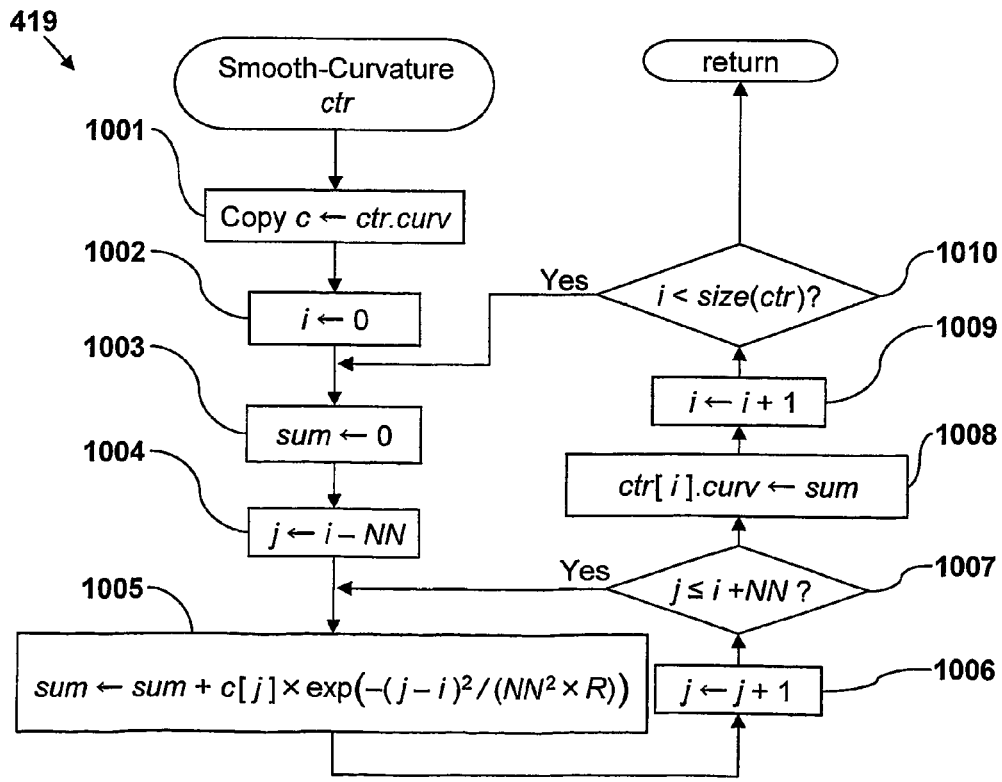
FIG. 10 shows a flow chart of the subroutine Smooth-Curvature.

FIG. 10 shows a flow chart of the subroutine Smooth-Curvature. It is called with a reference ctr to a contour record. The subroutine smoothes out the curvature values by convoluting with the Gaussian. It is assumed that curvature values are stored in the curv field of each pixel record. It first copies the curvature values to a cyclic container c of real numbers with the same size, i.e., size(c)=size(ctr) (1001), since the values in ctr will be modified. Two loops are used; outer loop (controlled by initialize-step 1002, increment-step 1009, and exit-test-step 1010) of index i runs from 0 to size(ctr)−1, and the inner loop (controlled by initialize-step 1004, increment-step 1006, and exit-test-step 1007) of index j from i−NN to i+NN, where NN is the same global variable used in Calculate-Curvature that has the radius of the neighborhood. The real number variable sum is initialized to zero at the beginning of the inner loop (1003). The number c[j] is multiplied by $\exp(-(j-i)^2/(NN^2 \times R))$ and added to sum (1005), where R is a parameter that controls the smoothness and exp(x) returns the exponential of x. The value used here is R=2. After the inner loop has exited, the value of sum is stored to ctr[i].curv (1008).

Find-Corners

Figure 12:
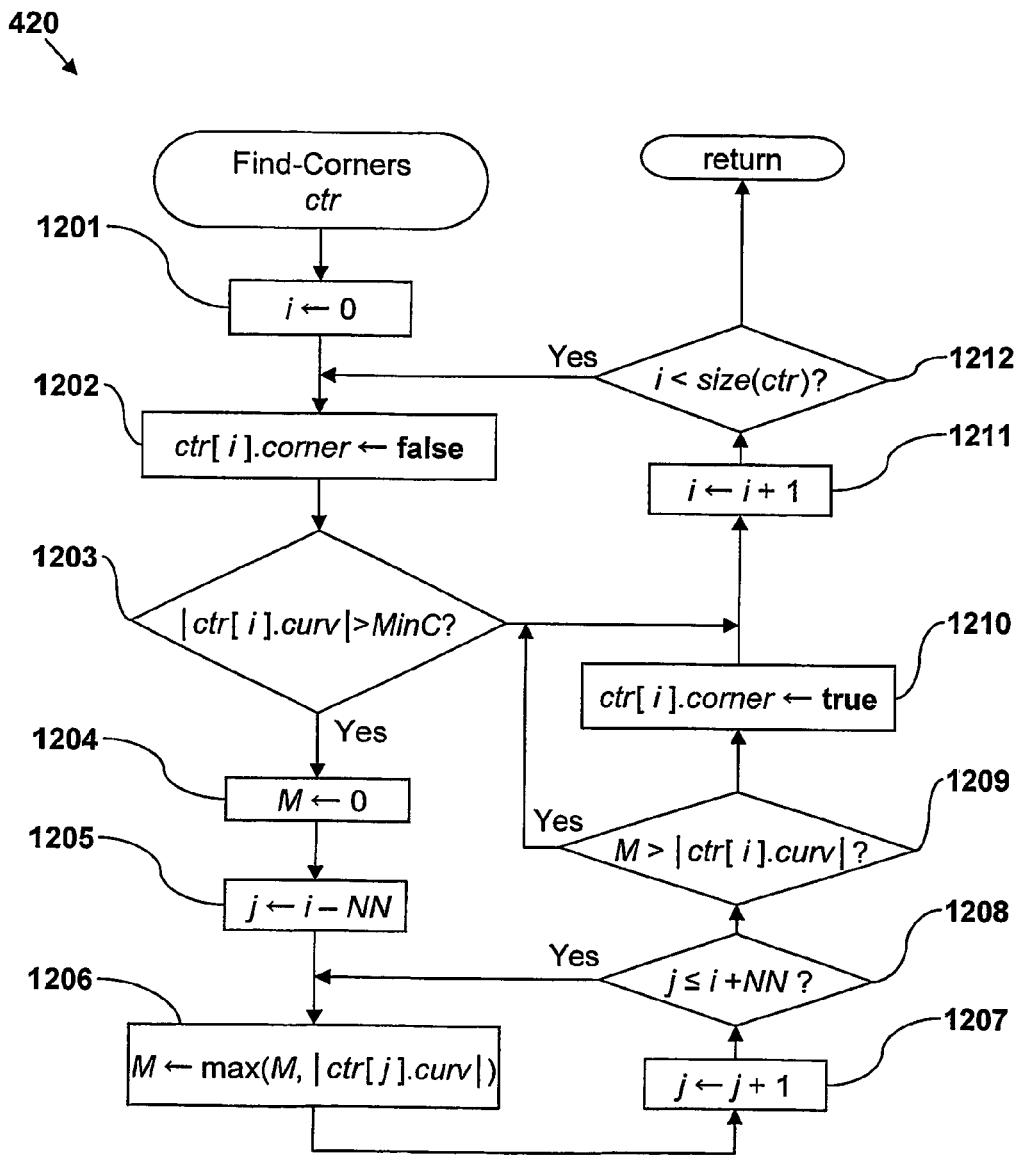
FIG. 12 shows a flow chart of the subroutine Find-Corners.

FIG. 12 shows a flow chart of the subroutine Find-Corners. It is called with a reference ctr to a contour record. The subroutine finds points that have the largest absolute curvature in their respective neighborhoods and have at least a predefined minimum absolute curvature. An outer loop (controlled by initialize-step 1201, increment-step 1211, and exit-test-step 1212) of index i runs from 0 to size(ctr)−1. For each pixel record in the contour, first the corner field is set to false (1202). Then the absolute curvature (absolute value of the curvature) at the point is examined (1203) and if it is not larger than the minimum curvature for a corner, which is stored in a global variable MinC, the loop continues. Here, the value of π/8 or 0.3927 is given for MinC. If it does have a larger absolute curvature than MinC, the maximum absolute curvature in the neighborhood of the record is examined using an inner loop (controlled by initialize-step 1205, increment-step 1207, and exit-test-step 1208). A real-number variable M is initialized to 0 (1204) and updated for each record in the neighborhood (1206). If it turns out that the original point has the maximum absolute curvature in its neighborhood (1209), the field corner is given the value true (1210).

INDUSTRIAL APPLICABILITY

While only certain preferred features of the invention have been illustrated and described herein, many modifications and changes will occur to those skilled in the art.

For instance, holes on the patterns can be found in essentially the same way. It is just a matter of finding black object inside non-black object, intead of the other way around. Corners in the perimeter of the hole can be identified in the same way as for the outline.

Also, after the curves are identified, they may be smoothed. For instance, one can fit parametric curves such as spline or Bezier curves to the digitized curves. Here it is important to know where corners are, as it is possible in the present invention, because in these parametric curves, corners are treated differently as points where tangent vectors can change discontinuously. The explicit representation of the outline in the digital pattern may then be the parameters of the parametric curves.

Furthermore, the disclosed method can be used to digitize any shapes that are not necessarily garment patterns. Patterns that are used to produce shoes, bags, and other sewed goods are only some of more obvious examples of the shapes for which the invention can be used.

It is, therefore, to be understood that the appended claims are intended to cover all such modifications and changes as fall within the true spirit of the invention.

We claim:

1. A method of digitizing shapes, said method comprising the steps of:
   receiving at least one data representing at least one shape;
   identifying at least one outline of the at least one shape in the at least one data, wherein the outline has a curvature; and
   identifying at least one corner of the at least one outline wherein said corner is identified by calculating the curvature of the outline in a neighborhood of a point on the outline and determining whether the curvature is at least a pre-defined minimum value.

2. A system for digitizing shapes, said system comprising:
   a memory arrangement including thereon a computer program; and
   a processing arrangement which, when executing the computer program is configured to:
   receive at least one data representing at least one shape;
   identify at least one outline of the at least one shape in the at least one data, wherein the outline has a curvature; and
   identify at least one corner having a relatively large average curvature of the at least one outline wherein said corner is identified by calculating the curvature of the outline in a neighborhood of a point on the outline and determining whether the curvature is at least a pre-defined minimum value.

3. Software stored in a storage medium which, when executed by a processing arrangement, is configured to digitize shapes, said software storage medium comprising:
   a first module which, when executed, receives at least one data representing at least one shape;
   a second module which, when executed, identifies at least one outline of the at least one shape in the at least one data, wherein the outline has a curvature; and
   a third module which, when executed, identifies at least one corner having a relatively large average curvature of the at least one outline wherein said corner is identified by calculating the curvature of the outline in a neighborhood of a point on the outline and determining whether the curvature is at least a pre-defined minimum value.

4. The method of claim 1, wherein identifying the at least one corner includes determining whether a point on the outline has the largest curvature in a neighborhood of a point.

5. The method of claim 1, wherein identifying the at least one outline includes identifying a boundary between the color of the pattern and the color of the background.

6. The method of claim 5, wherein the at least one outline is represented by a series of point coordinates.

7. The method of claim 1, wherein said digitized shape corresponds to the shape of a pattern for producing sewn goods.

8. The method of claim 1, wherein said digitized shape corresponds to the shape of a garment pattern.

9. The system of claim 2, wherein identifying the at least one corner includes determining whether a point on the outline has the largest curvature in a neighborhood of a point.

10. The system of claim 2, wherein identifying the at least one outline includes identifying a boundary between the color of the pattern and the color of the background.

11. The system of claim 10, wherein the at least one outline is represented by a series of point coordinates.

12. The system of claim 2, wherein said digitized shape corresponds to the shape of a pattern for producing sewn goods.

13. The system of claim 2, wherein said digitized shape corresponds to the shape of a garment pattern.

14. The software storage medium of claim 3, wherein identifying the at least one corner includes determining whether a point on the outline has the largest curvature in a neighborhood of a point.

15. The software storage medium of claim 3, wherein identifying the at least one outline includes identifying a boundary between the color of the pattern and the color of the background.

16. The software storage medium of claim 14, wherein the at least one outline is represented by a series of point coordinates.

17. The software storage medium of claim 3, wherein said digitized shape corresponds to the shape of a pattern for producing sewn goods.

18. The software storage medium of claim 3, wherein said digitized shape corresponds to the shape of a garment pattern.

* * * * *

UNITED STATES PATENT AND TRADEMARK OFFICE
CERTIFICATE OF CORRECTION

PATENT NO. : 7,031,527 B2  Page 1 of 1
APPLICATION NO. : 10/492722
DATED : April 18, 2006
INVENTOR(S) : Hiroshi Ishikawa It is certified that error appears in the above-identified patent and that said Letters Patent is hereby corrected as shown below:

Title Page, Item (75) Inventors, delete "John Amico, Bronxville, NY (US); Carmelo Sberna, Bronxville, NY (US)"

Signed and Sealed this

Twenty-fifth Day of August, 2009

David J. Kappos
*Director of the United States Patent and Trademark Office*